(12) United States Patent
Zhang et al.

(10) Patent No.: US 12,703,638 B2
(45) Date of Patent: Aug. 11, 2026

(54) MULTI-STAGE AMMONIA-BASED DECARBONIZATION

(71) Applicant: Jiangnan Environmental Protection Group Inc., Grand Cayman (KY)

(72) Inventors: Jun Zhang, Nanjing (CN); Lifang Qi, Beijing (CN); Jinyong Wang, Nanjing (CN); Jing Luo, Nanjing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 535 days.

(21) Appl. No.: 18/197,856

(22) Filed: May 16, 2023

(65) Prior Publication Data

US 2023/0373801 A1 Nov. 23, 2023

(30) Foreign Application Priority Data

May 20, 2022 (CN) ......................... 202210553333.1

(51) Int. Cl.
*B01D 53/14* (2006.01)
*B01D 53/18* (2006.01)
(Continued)

(52) U.S. Cl.
CPC ............ *C01C 1/26* (2013.01); *B01D 53/1406* (2013.01); *B01D 53/1412* (2013.01);
(Continued)

(58) Field of Classification Search
CPC .. C01C 1/26; B01D 53/1406; B01D 53/1412; B01D 53/1418; B01D 53/1475;
(Continued)

(56) References Cited

U.S. PATENT DOCUMENTS 2,810,627 A 10/1957 Johnstone et al.
3,752,877 A 8/1973 Beavon
(Continued)

FOREIGN PATENT DOCUMENTS

CN 1280032 A 1/2001
CN 201880482 U 6/2001
(Continued)

OTHER PUBLICATIONS

Google Patents English translation of CN1283346C.
(Continued)

*Primary Examiner* — Huy Tram Nguyen
(74) *Attorney, Agent, or Firm* — Weiss & Arons LLP

(57) ABSTRACT

Multi-stage ammonia-based decarbonization, characterized in that ammonia is used as an absorbent to absorb $CO_2$ in a process gas in an absorber, and the absorber may include four or more stages of absorption, where a first-stage absorption, a second-stage absorption, a third-stage absorption, a fourth-stage absorption, and higher-stage absorptions may be sequentially arranged along the flow direction of the process gas; and the temperature of the process gas in the second and third-stage absorptions may be controlled not to be lower than the temperature of the process gas in the first-stage absorption, and the temperature of the process gas in the fourth and any higher-stage absorptions may be controlled to be lower than the temperature of the process gas in the first-stage absorption.

19 Claims, 1 Drawing Sheet

(51) Int. Cl.
*B01D 53/62* (2006.01)
*B01D 53/78* (2006.01)
*C01C 1/26* (2006.01)

(52) U.S. Cl.
CPC ..... *B01D 53/1418* (2013.01); *B01D 53/1475* (2013.01); *B01D 53/18* (2013.01); *B01D 53/62* (2013.01); *B01D 53/78* (2013.01); *B01D 2251/2062* (2013.01); *B01D 2257/504* (2013.01)

(58) Field of Classification Search
CPC ........ B01D 53/18; B01D 53/62; B01D 53/78; B01D 2251/2062; B01D 2257/504; B01D 2252/102; Y02C 20/40
USPC .......................................................... 422/168
See application file for complete search history.

(56) References Cited

U.S. PATENT DOCUMENTS

| | | | |
|---|---|---|---|
| 3,983,217 | A | 9/1976 | Muraki et al. |
| 4,250,160 | A | 2/1981 | Eakman |
| 4,294,590 | A | 10/1981 | Linde et al. |
| 4,324,776 | A | 4/1982 | Kim |
| 4,378,977 | A | 4/1983 | Linde et al. |
| 4,552,747 | A | 11/1985 | Goar |
| 4,690,807 | A | 9/1987 | Saleem |
| 5,019,361 | A | 5/1991 | Hakka |
| 5,106,607 | A | 4/1992 | Chopin et al. |
| 5,362,458 | A | 11/1994 | Saleem et al. |
| 5,632,967 | A | 5/1997 | Nasato |
| 6,063,352 | A | 5/2000 | Risse et al. |
| 6,066,304 | A | 5/2000 | Freetly et al. |
| 6,139,807 | A | 10/2000 | Risse et al. |
| 6,221,325 | B1 | 4/2001 | Brown et al. |
| 6,444,185 | B1 | 9/2002 | Nougayrede et al. |
| 6,508,998 | B1 | 1/2003 | Nasato |
| 6,569,398 | B2 | 5/2003 | Fenderson |
| 6,616,908 | B2 | 9/2003 | Watson et al. |
| 6,776,974 | B1 | 8/2004 | Burmaster et al. |
| 6,991,771 | B2 | 1/2006 | Duncan et al. |
| 7,351,392 | B2 | 4/2008 | Chen et al. |
| 7,635,408 | B2 | 12/2009 | Mak et al. |
| 7,648,692 | B2 | 1/2010 | Chow et al. |
| 7,754,471 | B2 | 7/2010 | Chen et al. |
| 7,879,135 | B2 | 2/2011 | Ravikumar et al. |
| 7,910,077 | B2 | 3/2011 | Chow et al. |
| 8,178,070 | B2 | 5/2012 | Wong et al. |
| 8,206,669 | B2 | 6/2012 | Schaffer et al. |
| 8,361,432 | B2 | 1/2013 | Parekh et al. |
| 8,444,943 | B2 | 5/2013 | Lamar |
| 8,545,793 | B2 | 10/2013 | Thielert |
| 8,871,176 | B2 | 10/2014 | Liu et al. |
| 9,370,745 | B2 | 6/2016 | Xu et al. |
| 2003/0175190 | A1 | 9/2003 | Duncan et al. |
| 2007/0248518 | A1 | 10/2007 | Jung et al. |
| 2009/0004070 | A1 | 1/2009 | Chow et al. |
| 2009/0101012 | A1* | 4/2009 | Gal ........................ B01D 53/62 55/342 |
| 2011/0195008 | A1 | 8/2011 | Menzel et al. |
| 2011/0243822 | A1 | 10/2011 | Mortson |
| 2015/0352489 | A1 | 12/2015 | Luo et al. |

FOREIGN PATENT DOCUMENTS

| | | | |
|---|---|---|---|
| CN | 1377722 | A | 11/2002 |
| CN | 1178735 | C | 4/2003 |
| CN | 1408464 | A | 4/2003 |
| CN | 1164480 | C | 9/2004 |
| CN | 2640584 | Y | 9/2004 |
| CN | 2640585 | Y | 9/2004 |
| CN | 2668235 | Y | 1/2005 |
| CN | 1617831 | A | 5/2005 |
| CN | 2746971 | Y | 12/2005 |
| CN | 2746972 | Y | 12/2005 |
| CN | 2746973 | Y | 12/2005 |
| CN | 2754711 | Y | 2/2006 |
| CN | 1251965 | C | 4/2006 |
| CN | 2772609 | Y | 4/2006 |
| CN | 2778373 | Y | 5/2006 |
| CN | 2799059 | Y | 7/2006 |
| CN | 2799060 | Y | 7/2006 |
| CN | 1283346 | C | 11/2006 |
| CN | 1321723 | C | 6/2007 |
| CN | 101085410 | A | 12/2007 |
| CN | 201030298 | Y | 3/2008 |
| CN | 201052456 | Y | 4/2008 |
| CN | 100395006 | C | 6/2008 |
| CN | 201109711 | Y | 9/2008 |
| CN | 100428979 | C | 10/2008 |
| CN | 201129965 | Y | 10/2008 |
| CN | 201132102 | Y | 10/2008 |
| CN | 101352642 | A | 1/2009 |
| CN | 201179415 | Y | 1/2009 |
| CN | 100460045 | C | 2/2009 |
| CN | 100475313 | C | 4/2009 |
| CN | 101422693 | A | 5/2009 |
| CN | 201231130 | Y | 5/2009 |
| CN | 101524620 | | 9/2009 |
| CN | 201320447 | Y | 10/2009 |
| CN | 201333376 | Y | 10/2009 |
| CN | 101575103 | A | 11/2009 |
| CN | 101585511 | A | 11/2009 |
| CN | 201380037 | Y | 1/2010 |
| CN | 201380038 | Y | 1/2010 |
| CN | 201380039 | Y | 1/2010 |
| CN | 201380040 | Y | 1/2010 |
| CN | 100588608 | C | 2/2010 |
| CN | 101642629 | A | 2/2010 |
| CN | 201423237 | Y | 3/2010 |
| CN | 101274750 | B | 6/2010 |
| CN | 101745303 | A | 6/2010 |
| CN | 201492952 | U | 6/2010 |
| CN | 201529487 | U | 7/2010 |
| CN | 201529488 | U | 7/2010 |
| CN | 201537456 | U | 8/2010 |
| CN | 101274196 | B | 12/2010 |
| CN | 101909720 | A | 12/2010 |
| CN | 101182926 | B | 1/2011 |
| CN | 101519192 | B | 2/2011 |
| CN | 101579600 | B | 4/2011 |
| CN | 102000490 | A | 4/2011 |
| CN | 102012034 | A | 4/2011 |
| CN | 101456541 | B | 5/2011 |
| CN | 101576261 | B | 5/2011 |
| CN | 101579602 | B | 5/2011 |
| CN | 102061206 | A | 5/2011 |
| CN | 101274204 | B | 6/2011 |
| CN | 101670231 | B | 8/2011 |
| CN | 201912884 | U | 8/2011 |
| CN | 201912885 | U | 8/2011 |
| CN | 201944861 | U | 8/2011 |
| CN | 201949808 | U | 8/2011 |
| CN | 102205202 | A | 10/2011 |
| CN | 102380305 | A | 3/2012 |
| CN | 102381685 | A | 3/2012 |
| CN | 102381686 | A | 3/2012 |
| CN | 102423597 | A | 4/2012 |
| CN | 101791517 | B | 5/2012 |
| CN | 102451604 | A | 5/2012 |
| CN | 101456540 | B | 7/2012 |
| CN | 101574614 | B | 7/2012 |
| CN | 101637685 | B | 7/2012 |
| CN | 102631827 | A | 8/2012 |
| CN | 102688676 | A | 9/2012 |
| CN | 202460375 | U | 10/2012 |
| CN | 202460420 | U | 10/2012 |
| CN | 202460438 | U | 10/2012 |
| CN | 101530727 | B | 11/2012 |
| CN | 101955828 | B | 11/2012 |
| CN | 102211762 | B | 11/2012 |
| CN | 101972592 | B | 12/2012 |
| CN | 202538627 | U | 12/2012 |

(56) References Cited

FOREIGN PATENT DOCUMENTS

| | | | |
|---|---|---|---|
| CN | 101934191 | B | 1/2013 |
| CN | 102049186 | B | 1/2013 |
| CN | 102078743 | B | 1/2013 |
| CN | 202725003 | U | 2/2013 |
| CN | 202751942 | U | 2/2013 |
| CN | 202754802 | U | 2/2013 |
| CN | 202829575 | U | 3/2013 |
| CN | 101418246 | B | 4/2013 |
| CN | 103007719 | A | 4/2013 |
| CN | 202912691 | U | 5/2013 |
| CN | 202924730 | U | 5/2013 |
| CN | 202953829 | U | 5/2013 |
| CN | 102381687 | B | 8/2013 |
| CN | 203159221 | U | 8/2013 |
| CN | 203264545 | U | 11/2013 |
| CN | 203291675 | U | 11/2013 |
| CN | 102489140 | B | 12/2013 |
| CN | 103418223 | A | 12/2013 |
| CN | 203329558 | U | 12/2013 |
| CN | 203612955 | U | 5/2014 |
| CN | 102942162 | B | 8/2014 |
| CN | 203781842 | U | 8/2014 |
| CN | 102910593 | B | 9/2014 |
| CN | 102847431 | B | 10/2014 |
| CN | 103204477 | B | 10/2014 |
| CN | 103446859 | B | 10/2014 |
| CN | 104138713 | A | 11/2014 |
| CN | 103301732 | B | 1/2015 |
| CN | 103041679 | B | 2/2015 |
| CN | 103301736 | B | 2/2015 |
| CN | 104368231 | A | 2/2015 |
| CN | 204134465 | U | 2/2015 |
| CN | 204151066 | U | 2/2015 |
| CN | 102895870 | B | 3/2015 |
| CN | 102923670 | B | 3/2015 |
| CN | 204198421 | U | 3/2015 |
| CN | 103223292 | B | 4/2015 |
| CN | 104555939 | A | 4/2015 |
| CN | 204233957 | U | 4/2015 |
| CN | 103112831 | B | 5/2015 |
| CN | 204352660 | U | 5/2015 |
| CN | 103301705 | B | 8/2015 |
| CN | 103482583 | B | 9/2015 |
| CN | 104923046 | A | 9/2015 |
| CN | 104927894 | A | 9/2015 |
| CN | 104941423 | A | 9/2015 |
| CN | 104946296 | A | 9/2015 |
| CN | 103463949 | B | 12/2015 |
| CN | 105110819 | A | 12/2015 |
| CN | 105126573 | A | 12/2015 |
| CN | 104353258 | B | 1/2016 |
| CN | 104249995 | B | 4/2016 |
| CN | 205235588 | U | 5/2016 |
| CN | 205245200 | U | 5/2016 |
| CN | 205252720 | U | 5/2016 |
| CN | 205252721 | U | 5/2016 |
| CN | 205252722 | U | 5/2016 |
| CN | 205262780 | U | 5/2016 |
| CN | 103822217 | B | 6/2016 |
| CN | 105757688 | A | 7/2016 |
| CN | 104555940 | B | 8/2016 |
| CN | 105841168 | A | 8/2016 |
| CN | 104524948 | B | 9/2016 |
| CN | 205549846 | U | 9/2016 |
| CN | 205562498 | U | 9/2016 |
| CN | 103521060 | B | 1/2017 |
| CN | 103939918 | B | 1/2017 |
| CN | 104208992 | B | 2/2017 |
| CN | 104258713 | B | 2/2017 |
| CN | 104528659 | B | 4/2017 |
| DE | 3733319 | A1 | 9/1989 |
| EP | 165609 | B1 | 6/1985 |
| EP | 212523 | A2 | 3/1987 |
| JP | S47-043737 | | 11/1972 |
| TW | 497985 | | 8/2002 |
| WO | WO200507505 | A1 | 8/2005 |
| WO | WO2005113429 | A1 | 12/2005 |
| WO | WO2006113935 | A2 | 10/2006 |
| WO | WO2012152919 | A1 | 11/2012 |

OTHER PUBLICATIONS

Google Patents English translation of CN2640585Y.
Google Patents English translation of CN2772609Y.
Google Patents English translation of CN100428979C.
Google Patents English translation of CN201912885U.
Google Patents English translation of CN10322392A.
Office Action issued in U.S. Appl. No. 14/829,905 on Nov. 16, 2015.
Office Action issued in U.S. Appl. No. 14/829,905 on Feb. 29, 2016.
Office Action issued in U.S. Appl. No. 14/829,909 on Apr. 15, 2016.
Office Action issued in U.S. Appl. No. 14/829,909 on Dec. 14, 2016.
Office Action issued in U.S. Appl. No. 14/829,909 on Feb. 14, 2017.
International Search Report issued for International Application No. PCT/CN2013/074657, Dec. 26, 2013.
International Search Report issued for International Application No. PCT/CN2014/087887, Jan. 14, 2015.
Supplementary European Search Report issued in European Application No. 13882863.7, Mar. 11, 2016.
Office Action issued by the Japanese Intellectual Property Office in Japanese Application No. 2017-123088, on Apr. 16, 2018.
Wende Xiao and Zhiquan Wu, "Sulfur Dioxide Removal and Recovery," Chemical Industry Press (China), 143-145, May 2001.
Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.
"Introduction to FGD for China Shenhua Coal to Liquid(CTL) Project," Jiangnan Environmental Technology, Inc., 19th Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19th Annual Electric Power Conference and Exhibition, Apr. 13, 2017, Chicago, Illinois.

* cited by examiner

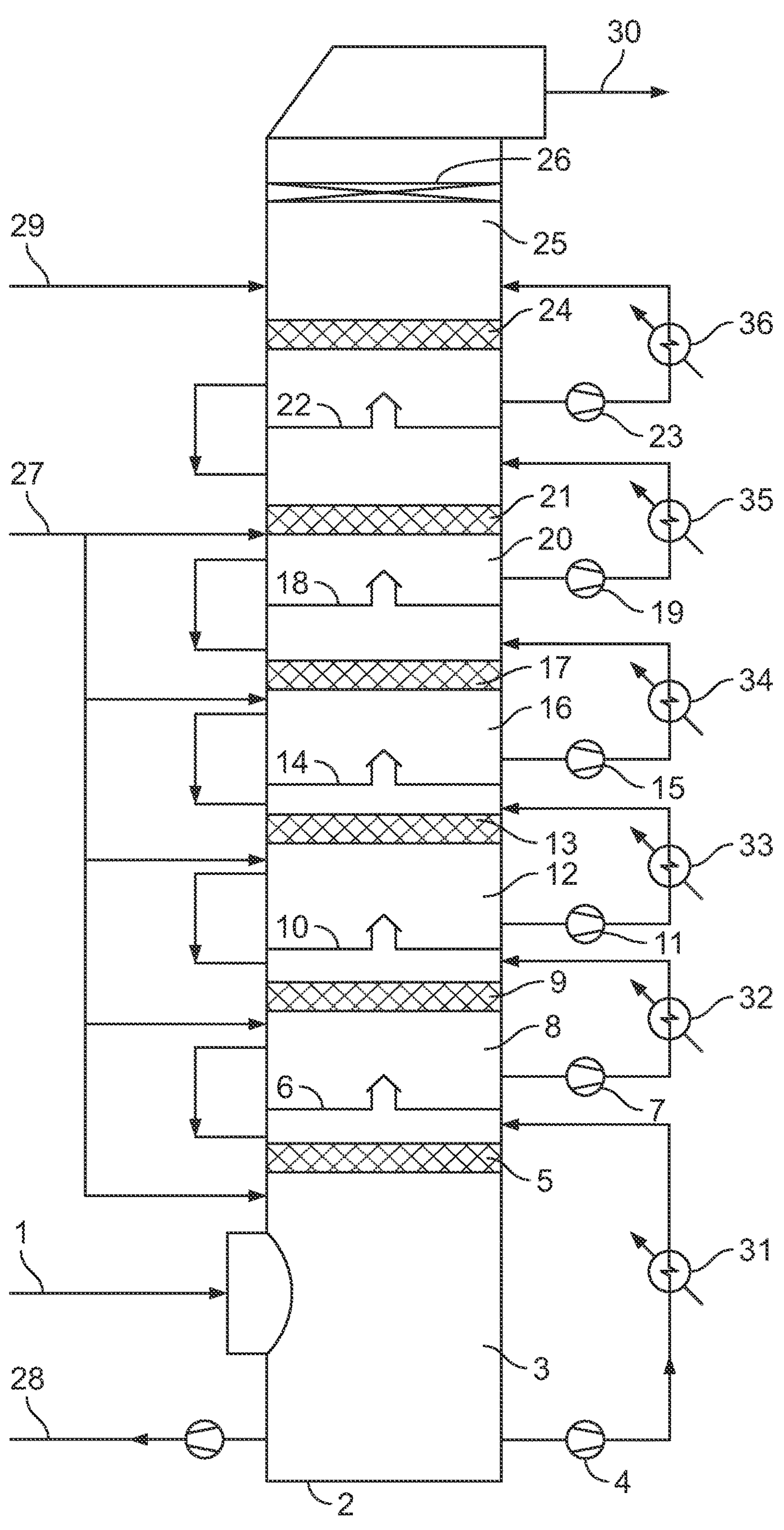
30
26
25
29
24
36
22
23
27
21
35
20
18
19
17
34
16
14
15
13
33
12
10
11
9
32
8
6
7
5
1
31
3
28
4
2

MULTI-STAGE AMMONIA-BASED DECARBONIZATION

CROSS-REFERENCE

This application claims the benefit under 35 U.S.C. 119(a) of Chinese Patent Application No. CN202210553333.1, filed May 20, 2022, which is hereby incorporated by reference herein in its entirety.

TECHNICAL FIELD

The present invention relates to the technical field of environmental protection, and in particular to a multi-stage decarbonization method with improved capture efficiency of $CO_2$ in a process gas.

BACKGROUND

Climate warming is a problem that affects the development of all humans, and $CO_2$ is the main contributor to climate warming. Gases generated from production activities contain a large amount of $CO_2$. In order to control $CO_2$ emissions on a large scale and combat climate warming, it is necessary to focus on developing technologies that can efficiently capture $CO_2$.

The chemical absorption method using ammonia as an absorption liquid has the characteristics of strong absorption capacity, low corrosion, low regeneration energy consumption, low replenishment cost, and simultaneously removal of multiple acid gas pollutants, and has been widely studied by scholars at home and abroad.

Patent No. CN102078743B discloses an improved $CO_2$ inorganic absorbent which includes a carbonated aqueous ammonia and an additive. The total ammonia mass fraction of the carbonated aqueous ammonia is 4% to 12%, the additive is sodium phosphate or potassium phosphate, the ratio of the molar concentration of the additive to the total ammonia molar concentration of the carbonated aqueous ammonia is 0.04 to 0.20, and the balance is deionized water. The use of the additive may affect the product purity of ammonium bicarbonate.

Patent No. CN102688676A discloses an ammonia-based decarbonization process for power plant flue gas. The flue gas is cooled to 45° C. to 55° C. by means of desulfurization and dust removal, before entering a decarbonization absorption tower and is in countercurrent contact with an absorption liquid in the decarbonization absorption tower, where the total ammonia mass fraction of the absorption liquid is controlled at 3% to 5%. The $CO_2$ in the flue gas is absorbed, the absorption rich solution after absorbing $CO_2$ is introduced into a regeneration tower, and the rich solution is heated to desorb and release $CO_2$, where the desorption temperature is 85° C. to 95° C. Then, the absorption liquid returns to the decarbonization absorption tower to start a new round of absorption. Sodium bicarbonate or potassium bicarbonate is added in the absorption liquid, and the concentration of the sodium bicarbonate or potassium bicarbonate added is 0.1 mol/L to 0.5 mol/L. This technology is an ammonia-based decarbonization process for power plant flue gas that has high $CO_2$ desorption rate, maintains unchanged $CO_2$ loading in the absorption fluid during the recycling process, and ensures the absorption capacity of the solution for $CO_2$.

Patent No. CN103007719A discloses a double-circulation, ammonia-based flue gas decarbonization device. The device is designed with two circulation sections in which a solid product is separated from the bottom portion in order to resolve the low absorption efficiency issue in the existing device for the ammonia-based absorption of $CO_2$ from flue gas in a power plant. The device is prone to blockage. The two-circulation section design of this device is aimed at solving the problem of solid blockage only without considering the relationship between ammonia-based decarbonization absorption and temperature control.

Patent No. CN200880122376.2 discloses a multi-stage $CO_2$ removal system and method for processing a flue gas stream. By use of an absorber container, the flue gas stream is contacted with an ionic solution containing ammonia in a low-temperature condition at 0° C. to 20° C., and the solution in the first absorption stage has a higher temperature and lower ammonia-to-carbon ratio than the solution in the third absorption stage. Ammonia escape can be reduced by controlling at a low temperature and making the third stage have a lower temperature. However, a higher ammonia-to-carbon ratio of the third stage increases ammonia escape.

Therefore, there remains a need for an ammonia-based decarbonization process that exhibits high absorption efficiency and effectively controls ammonia escape.

BRIEF DESCRIPTION OF THE DRAWING

FIG. 1 is a schematic diagram of an ammonia-based decarbonization device in some embodiments of the present invention.

Meanings of numerals in FIG. 1 are as follows: 1. Process gas; 2. Absorber; 3. First-stage absorption of the absorber; 4. First-stage circulation pump; 5. First-stage packing; 6. First-stage liquid collector; 7. Second-stage circulation pump; 8. Second-stage absorption of the absorber; 9. Second-stage packing; 10. Second-stage liquid collector; 11. Third-stage circulation pump; 12. Third-stage absorption of the absorber; 13. Third-stage packing; 14. Third-stage liquid collector; 15. Fourth-stage circulation pump; 16. Fourth-stage absorption of the absorber; 17. Fourth-stage packing; 18. Fourth-stage liquid collector; 19. Fifth-stage circulation pump; 20. Fifth-stage absorption of the absorber; 21. Fifth-stage packing; 22. Fifth-stage liquid collector; 23. Sixth-stage circulation pump; 24. Sixth-stage packing; 25. Sixth-stage absorption of the absorber; 26. Demister; 27. Ammonia; 28. Ammonium bicarbonate solution/slurry; 29. Water replenishing; 30. Decarbonized gas; 31. First-stage heat exchanger; 32. Second-stage heat exchanger; 33. Third-stage heat exchanger; 34. Fourth-stage heat exchanger; 35. Fifth-stage heat exchanger; 36. Sixth-stage heat exchanger.

DETAILED DESCRIPTION

Apparatus and methods for decarbonization are provided.

The methods may include absorbing, using ammonia, $CO_2$ from a process gas in an absorber. The absorber may include four or more stages of absorption. The stages may include a first-stage absorption corresponding to a first stage of absorption. The stages may include a second-stage absorption corresponding to a second stage of absorption. The stages may include a third-stage absorption corresponding to a third stage of absorption. The stages may include a fourth-stage absorption corresponding to a fourth stage of absorption. The stages may include one or more higher stage-absorptions corresponding to higher stages of absorption.

The stages may be sequentially arranged along a flow direction of the process gas. The methods may include controlling a temperature of the process gas in the second and third-stage absorptions to be not lower than a temperature of the process gas in the first-stage absorption. The methods may include controlling a temperature of the process gas in the fourth and higher-stage absorptions to be lower than the temperature of the process gas in the first-stage absorption.

The methods may include, in the absorber, adding ammonia to a circulating liquid in the stages. An amount of ammonia added in the last stage may be less than that added in the stage immediately prior to the last stage.

The methods may include controlling, in the absorber, adding ammonia to a circulating liquid in the stages. An amount of ammonia added in the first stage may be less than that added in a stage immediately following the first stage.

The methods may include controlling a temperature of the process gas in the second stage and a temperature of the process gas in the third stage to be the same.

The methods may include controlling a temperature of the process gas in the third stage to be higher than a temperature of the process gas in the second stage.

The methods may include controlling a temperature of the process gas in the first-stage to be in the range 10° C. to 30° C.; controlling temperatures of the process gas in each of the second- and third-stages to be in the range 15° C. to 35° C.; and controlling temperatures of the process gas in each of the fourth- and higher-stages to be in the range 5° C. to 25° C.; all while temperatures of the process gas in each of the second- and third-stage absorptions are not lower than the temperature of the process gas in the first-stage absorption; and temperatures of the process gas in each of the fourth- and higher-stage absorptions are lower than the temperature of the process gas in the first-stage absorption.

The methods may include promoting generation of ammonium bicarbonate in the first-stage absorption by controlling a temperature of the process gas in the first-stage of absorption. The methods may include promoting generation of ammonium bicarbonate in the first-stage absorption by controlling an amount of ammonia addition to the stages.

The methods may include collecting in the first-stage absorption an ammonium bicarbonate solution or slurry. The methods may include producing from the solution or slurry solid ammonium bicarbonate.

The methods may include reducing a temperature of a circulating liquid fed to the stages by use of a heat exchanger. The methods may include reducing a temperature of the process gas by spraying the circulating liquid at the process gas.

The methods may include, when absorption liquid is used in multiple stages along a flow direction of the process gas, and water is used in a last of the stages, replenishing the absorption liquid in a sequence from one of the stages to an immediately previous stage. The methods may include, when absorption liquid is used in multiple stages along a flow direction of the process gas, and water is used in a last of the stages, replenishing the water.

The apparatus may include a device for decarbonization.

The device may include a first-stage absorption vessel corresponding to a first-stage absorption. The device may include a second-stage absorption vessel corresponding to a second-stage absorption. The device may include a third-stage absorption vessel corresponding to a third-stage absorption. The device may include a fourth-stage absorption vessel corresponding to a fourth-stage absorption. The device may include one or more higher-stage absorption vessels, each corresponding to a higher-stage absorption. The device may include an ammonia addition source. The ammonia addition source may be configured to supply an ammonia absorbent to one or more of the vessels. The device may include a temperature controller that is configured to control process gas temperatures such that temperatures in each of the second- and third-stage vessels are not lower than a temperature of the process gas in the first-stage absorption vessel. The device may include a temperature controller that is configured to control process gas temperatures such that temperatures in each of the fourth- and higher-stage absorption vessels are lower than a temperature of the process gas in the first-stage absorption.

The ammonia addition source may be configured to supply the ammonia absorbent to two or more of the vessels such that an amount of ammonia added to circulating liquid in the highest stage vessel is less than that added in the immediately preceding stage vessel.

The ammonia addition source may be configured to supply the ammonia absorbent to two or more of the vessels such that an amount of ammonia added to circulating liquid in the first-stage vessel is less than that added in the second-stage vessel.

The temperature controller may be configured to control temperatures of the process gas in the second- and third-stage absorption vessels to be the same.

The temperature controller may be configured to control a temperature of the process gas in the second-stage absorption vessel to be lower than a temperature of the process gas in the third-stage absorption vessel.

The temperature controller may be configured to control a temperature of the process gas in the first-stage absorption vessel to be in the range 10° C. to 30° C.; temperatures of the process gas in each of the second- and third-stage absorption vessels to be in the range 15° C. to 35° C.; temperatures of the process gas in each of the fourth- and higher-stage absorption vessels to be in the range 5° C. to 25° C.; all while temperatures of the process gas in the second- and third-stage absorption vessels are not lower than the temperature of the process gas in the first-stage absorption vessel; and temperatures of the process gas in the fourth- and higher-stage absorption vessels are lower than the temperature of the process gas in the first-stage absorption vessel.

The device may include an ammonium bicarbonate post-treatment unit. The ammonium bicarbonate post-treatment unit may be configured to receive an ammonium bicarbonate solution or slurry from the first-stage absorption vessel. The ammonium bicarbonate post-treatment unit may be configured to produce solid ammonium bicarbonate therefrom.

One or more of the vessels may be disposed together with one or more of the other vessels in one or more towers. A device/component that allows gas to pass through may be disposed between the vessels. At least one layer of circulating-liquid distributor may be disposed in each vessel. At least one layer of gas-liquid contact component may be disposed in each vessel.

The vessels may be arranged in first sequence, along the flow direction of the process gas, starting with the first-stage absorption vessel and continuing to higher-stage vessels. The apparatus may be configured to replenish absorption liquid used in the stages in a second sequence that is opposite the first sequence. Water may be replenished in the highest stage. Water may be replenished only in the highest of the stages.

The apparatus and methods may provide an ammonia-based decarbonization process having four or more stages of absorption. The apparatus and methods may provide control of the temperature profile in each absorption stage. The apparatus and methods may provide control of ammonia addition, high absorption efficiency and control for ammonia escape.

The methods may use ammonia as an absorbent to absorb $CO_2$ in a process gas in an absorber and the absorber may include four or more stages of absorption, wherein one or more of a first-stage absorption, a second-stage absorption, a third-stage absorption, a fourth-stage absorption, and one or more higher-stage absorptions may be sequentially arranged along the flow direction of the process gas; and the temperature of the process gas in the second and third-stage absorptions may be controlled to be not lower than the temperature of the process gas in the first-stage absorption, and the temperature of the process gas in the fourth and any higher-stage absorptions may be controlled to be lower than the temperature of the process gas in the first-stage absorption.

The apparatus may include one or more of a first-stage absorption, a second-stage absorption, a third-stage absorption, a fourth-stage absorption, and one or more higher-stage absorptions, sequentially arranged along the flow direction of a process gas; an ammonia addition means that may be configured to supply an ammonia absorbent to one or more stages of absorption; and a temperature control means that may be configured to control the temperature of the process gas in the second and third-stage absorptions to be not lower than the temperature of the process gas in the first-stage absorption and control the temperature of the process gas in the fourth and any higher-stage absorptions to be lower than the temperature of the process gas in the first-stage absorption.

The apparatus may include a multi-stage ammonia-based decarbonization method, characterized in that ammonia may be used as an absorbent to absorb $CO_2$ in a process gas in an absorber, and the absorber may include four or more stages of absorption, wherein a first-stage absorption, a second-stage absorption, a third-stage absorption, a fourth-stage absorption, and any higher-stage absorptions may be sequentially arranged along the flow direction of the process gas; and the temperature of the process gas in the second and third-stage absorptions may be controlled to be not lower than the temperature of the process gas in the first-stage absorption, and the temperature of the process gas in the fourth and any higher-stage absorptions may be controlled to be lower than the temperature of the process gas in the first-stage absorption.

Those skilled in the art can understand that water can be used as an absorption medium in the methods of the present disclosure.

The temperature of the process gas in the second- and third-stage absorptions may be controlled to be higher than the temperature of the process gas in the first-stage absorption by at least 1° C., at least 2° C., at least 3° C. or by any other suitable number of degrees.

The temperature of the process gas in the fourth and any higher-stage absorptions may be controlled to be lower than the temperature of the process gas in the first-stage absorption by at least 1° C., at least 2° C., at least 3° C. or by any other suitable number of degrees. Multi-stage ammonia addition may be performed in the absorber, and the amount of ammonia added into a circulating liquid in the last stage of decarbonization absorption may be less than that in the previous stage or no ammonia is added. The addition of ammonia into the absorption circulating liquid may result in formation of carbamate or carbonate. This manner of ammonia addition, if any, to the circulating liquid in the last stage of decarbonization may be beneficial in reducing formation of carbamate or carbonate and also in controlling ammonia escape.

The ammonia addition into the circulating liquid in the last stage of decarbonization absorption may be 20 wt % (weight-percent) or less, 10 wt % or less, 5 wt % or less, or 0 wt %, of the total amount of ammonia added in the whole process.

The process gas in the second and third-stage absorptions may be controlled to have the same temperature.

The temperature of the process gas in the second-stage absorption may be controlled to be lower than the temperature of the process gas in the third-stage absorption by, for example, at least 2° C. or 3° C.

The temperature of the process gas in the first-stage absorption may be controlled at 10° C. to 30° C., and the temperature of the process gas in the second and third-stage absorptions may be controlled at 15° C. to 35° C. The temperature of the process gas in the fourth and any higher-stage absorptions may be controlled at 5° C. to 25° C., and the temperature of the process gas in the second and third-stage absorptions is not lower than the temperature of the process gas in the first-stage absorption and the temperature of the process gas in the fourth and any higher-stage absorptions is lower than the temperature of the process gas in the first-stage absorption.

The methods may include controlling the temperature of the process gas in the first-stage absorption and the ammonia addition to promote generation of ammonium bicarbonate in the first-stage absorption.

Multi-stage ammonia addition may be performed in the absorber, and the amount of ammonia added into a circulating liquid in the first stage of decarbonization absorption may be less than an ammonia added into a circulating liquid in the second stage of decarbonization absorption or it may be that no ammonia is added. The ammonia added into a circulating liquid in the first stage of decarbonization absorption may be 70 wt % or less, for example, 50 wt % or less, 30 wt % or less, or 10 wt % or less, of the ammonia added into the circulating liquid in the second stage of decarbonization absorption. This ammonia addition manner may help increase the production of ammonium bicarbonate.

An ammonium bicarbonate solution or slurry may be collected in the first-stage absorption for the production of solid ammonium bicarbonate.

A multi-stage absorption system of the absorber may be combined in one or more towers, and a device/component that allows gas to pass through may be disposed between stages.

At least one layer of circulating liquid distributor may be disposed in each stage of absorption.

At least one layer of gas-liquid contact component may be disposed in each stage of absorption, and the gas-liquid contact component may include packing.

The temperature of the circulating liquid may be reduced by means of a heat exchanger, and the temperature of the process gas may be reduced by spraying the circulating liquid.

The absorption liquid used in multiple stages along the flow direction of the process gas may be replenished in a sequence from the latter stage to the previous stage, and water may be replenished in the last stage.

The apparatus may include a device for implementing the methods. The device may include a first-stage absorption, a second-stage absorption, a third-stage absorption, a fourth-stage absorption, and higher-stage absorptions, sequentially arranged; an ammonia addition means that may be configured to supply an ammonia absorbent to one or more stages of absorption; and a temperature control means that may be configured to control the temperature of the process gas in the second and third-stage absorptions to be not lower than the temperature of the process gas in the first-stage absorption and control the temperature of the process gas in the fourth and any higher-stage absorptions to be lower than the temperature of the process gas in the first-stage absorption.

The ammonia addition means in the device may be configured to supply the ammonia absorbent to multi-stage absorption, wherein the amount of ammonia added into a circulating liquid in the last stage of decarbonization absorption is less than that in the previous stage or no ammonia is added.

The ammonia addition means in the device of the present disclosure may be configured to supply the ammonia absorbent to multi-stage absorption, where the amount of ammonia added into a circulating liquid in the first stage of decarbonization absorption is less than that in the latter stage or no ammonia is added.

The temperature control means in the device may be configured to control the process gas in the second and third-stage absorptions to have the same temperature.

The temperature control means in the device may be configured to control the temperature of the process gas in the second-stage absorption to be lower than the temperature of the process gas in the third-stage absorption.

The temperature control means in the device may be configured to control the process gas in the second and third-stage absorptions to have the same temperature.

The temperature control means in the device may be configured to control the temperature of the process gas in the first-stage absorption to be 10° C. to 30° C., and control the temperature of the process gas in the second and third-stage absorptions to be 15° C. to 35° C.; and control the temperature of the process gas in the fourth and any higher-stage absorptions to be 5° C. to 25° C., provided that the temperature of the process gas in the second and third-stage absorptions is not lower than the temperature of the process gas in the first-stage absorption and the temperature of the process gas in the fourth and any higher-stage absorptions is lower than the temperature of the process gas in the first-stage absorption.

The device may include an ammonium bicarbonate post-treatment unit that it configured to receive an ammonium bicarbonate solution or slurry from the first-stage absorption and produce solid ammonium bicarbonate therefrom.

The multi-stage absorption in the device may be deployed in one or more towers, and a device/component that allows gas to pass through may be disposed between stages.

At least one layer of circulating liquid distributor may be disposed in each stage of absorption in the device.

At least one layer of gas-liquid contact component, for example, packing, may be disposed in each stage of absorption in the device.

In the device, the absorption liquid used in multiple stages along the flow direction of the process gas may be replenished in a sequence from the latter stage to the previous stage, and water may be replenished in the last stage.

Illustrative embodiments of apparatus and methods in accordance with the principles of the invention will now be described with reference to the accompanying drawings, which form a part hereof. It is to be understood that other embodiments may be utilized and that structural, functional and procedural modifications, additions or omissions may be made, and features of illustrative embodiments, whether apparatus or method, may be combined, without departing from the scope and spirit of the present invention.

FIG. 1 shows an illustrative example of the apparatus and methods is described below with reference to the accompanying drawing. A process gas 1 containing carbon dioxide may enter an absorber 2, and may be first subjected to first-stage absorption 3. A liquid may be pumped to the top portion of the first stage by means of a first-stage circulation pump 4, may flow through a first-stage packing 5 and may contact the process gas, and may then return to the bottom portion of the first stage. A first-stage circulating liquid may be cooled by means of a heat exchanger 31, and the temperature of the process gas may be reduced after the circulating liquid contacts the process gas. Ammonia 27 may be added into the first-stage absorption liquid through a pipe, and carbon dioxide in the process gas may be absorbed by liquid-gas contact. The process gas subjected to the first-stage absorption and cooling may enter the second-stage absorption through a liquid collector 6, and the process procedure may be the same as that in the first stage. A second-stage absorption liquid may overflow to the first-stage absorption. The process gas may be subjected to the second-stage absorption and cooling may enter the third-stage absorption through a liquid collector 10, and the process procedure may be the same as that in the first stage. A third-stage absorption liquid may overflow to the second-stage absorption. The treated process gas may then pass through the similar third-stage absorption, fourth-stage absorption, fifth-stage absorption, and sixth-stage absorption sequentially.

The ammonium bicarbonate solution or slurry may be discharged from the bottom portion of the first-stage absorption through a pump for the production of solid ammonium bicarbonate (not shown).

System water replenishing 29 may be performed in the sixth-stage absorption. A demister may be disposed at the top portion of the sixth-stage absorption, and the demisted process gas is discharged from the tower top.

EXAMPLES

Ammonia-based decarbonization was performed by using the device shown in the accompanying drawing.

In the method, the amount of ammonia added to a first-stage absorption liquid was 2 wt % of the total amount of ammonia added, the amount of ammonia added to a second-stage absorption liquid was 8 wt % of the total amount of ammonia added, the amount of ammonia added to a third-stage absorption liquid was 40 wt % of the total amount of ammonia added, the amount of ammonia added to a fourth-stage absorption liquid was 30 wt % of the total amount of ammonia added, and the amount of ammonia added to a fifth-stage absorption liquid was 10 wt % of the total amount of ammonia added. No ammonia was added in a sixth-stage absorption liquid.

The temperature in each absorption stage was controlled as follows:

first stage: 25° C.
second stage: 30° C.
third stage: 33° C.
fourth stage: 22° C.
fifth stage: 22° C.
sixth stage: 22° C.

99.6% anhydrous ammonia was used as the absorbent for decarbonization, and the parameters of the process gas before decarbonization are shown in the table below:

| No. | Item | Value |
|---|---|---|
| 1 | Gas flow rate, $Nm^3/h$ | 80000 |
| 2 | Temperature, ° C. | 25 |
| 3 | $SO_2$ content, $mg/Nm^3$ | 5 |
| 4 | $CO_2$ content, v % (volume-percent) | 13 |
| 5 | $NH_3$ content, ppm | 3 |

The main parameters after treatment by a decarbonization tower are shown in the table below:

| No. | Item | Value |
|---|---|---|
| 1 | Gas flow rate at decarbonization tower outlet, $Nm^3/h$ | 73896 |
| 2 | $CO_2$ content at decarbonization tower outlet, v % | 5.75 |
| 3 | $NH_3$ content at decarbonization tower outlet, ppm | 1000 |
| 4 | Decarbonization efficiency, % | 60 |
| 5 | Ammonium bicarbonate byproduct, t/h | 22.5 |
| 6 | Consumption of 99.6% anhydrous ammonia, t/h | 4.86 |

Comparative Example 1

Compared with Example 1, the only difference was ammonia addition. Ammonia was added in all of the first to sixth-stage decarbonization absorption regions with equivalent ammonia addition in the six stages.

Because the ammonia added in the first-stage decarbonization absorption region reached 16.7%, ammonium bicarbonate were not be generated in the solution, and ammonium bicarbonate crystals were not obtained. The amount of ammonia added in the six-stage decarbonization absorption region reached 16.7%, resulting in a large increase in the escape of ammonia for decarbonization, and the ammonia escape from the process gas subjected to decarbonization reached up to 5000 ppm. Accordingly, the load on a subsequent ammonia removal apparatus increased.

The main parameters of the gas after decarbonization are shown in the table below:

| No. | Item | Value |
|---|---|---|
| 1 | Gas flow rate at decarbonization absorption tower outlet, $Nm^3/h$ | 77339 |
| 2 | $CO_2$ content at decarbonization absorption tower outlet, v % | 8.11 |
| 3 | $NH_3$ content at decarbonization absorption tower outlet, ppm | 5000 |
| 4 | $SO_2$ content at decarbonization absorption tower outlet, $mg/Nm^3$ | 5 |
| 5 | Decarbonization efficiency, % | 40 |
| 6 | Ammonium bicarbonate byproduct, t/h | 15.0 |
| 7 | Consumption of 99.6% anhydrous ammonia, t/h | 3.39 |

Comparative Example 2

Compared with Example 1, the only difference was temperature control. The temperature of the first-stage decarbonization absorption region was 25° C., and the temperatures of the second to sixth-stage decarbonization absorption regions were the same, all set to 22° C.

Because the second and third decarbonization absorption regions were controlled to have a relatively low temperature and have a reduced temperature difference from a cold source, heat exchange areas required by the heat exchangers 32 and 33 were increased as compared with the heat exchange areas in Example 1, thus increasing the equipment investment cost. Also, when the ambient temperature is 22° C., a cold source for the heat exchangers 32 and 33 in the second and third decarbonization absorption regions in Example 1 may be low-temperature ambient air which is cooled by an air cooler, so as to save the operating cost. In Comparative example 2, because the ambient temperature and the target temperature are equal, both set to 22° C., it was not desirable to achieve cooling with an air cooler, and chilled water with high energy consumption was used for cooling.

ILLUSTRATIVE EMBODIMENTS

1. A multi-stage ammonia-based decarbonization method, characterized in that ammonia is used as an absorbent to absorb $CO_2$ in a process gas in an absorber and the absorber comprises four or more stages of absorption, wherein a first-stage absorption, a second-stage absorption, a third-stage absorption, a fourth-stage absorption, and an optional higher-stage absorption are sequentially arranged along the flow direction of the process gas; and the temperature of the process gas in the second and third-stage absorptions is controlled not to be lower than the temperature of the process gas in the first-stage absorption, and the temperature of the process gas in the fourth and optional higher-stage absorptions is controlled to be lower than the temperature of the process gas in the first-stage absorption.

2. The method according to embodiment wherein multi-stage ammonia addition is performed in the absorber, and the amount of ammonia added into a circulating liquid in the last stage of decarbonization absorption is less than that in the previous stage or no ammonia is added.

3. The method according to embodiment wherein multi-stage ammonia addition is performed in the absorber, and the amount of ammonia added into a circulating liquid in the first stage of decarbonization absorption is less than that in the latter stage or no ammonia is added.

4. The method according to embodiment wherein the process gas in the second and third-stage absorptions is controlled to have the same temperature.

5. The method according to embodiment wherein the temperature of the process gas in the third stage is controlled to be higher than that of the process gas in the second stage.

6. The method according to embodiment wherein the temperature of the process gas in the first-stage absorption is controlled at 10° C. to 30° C., and the temperature of the process gas in the second and third-stage absorptions is controlled at 15° C. to 35° C.; and the temperature of the process gas in the fourth and optional higher-stage absorptions is controlled at 5° C. to 25° C., provided that the temperature of the process gas in the second and third-stage absorptions is not lower than the temperature of the process gas in the first-stage absorption and the temperature of the process gas in the fourth and optional higher-stage absorptions is lower than the temperature of the process gas in the first-stage absorption.

7. The method according to embodiment wherein the temperature of the process gas in the first-stage absorption and the amount of ammonia added are controlled to promote generation of ammonium bicarbonate in the first-stage absorption.
8. The method according to embodiment wherein an ammonium bicarbonate solution or slurry is collected in the first-stage absorption, and is used to produce solid ammonium bicarbonate.
9. The method according to embodiment wherein the absorber is combined in one or more towers, and a device/component that allows gas to pass through is disposed between stages.
10. The method according to embodiment wherein at least one layer of circulating liquid distributor is disposed in each stage of absorption.
11. The method according to embodiment wherein at least one layer of gas-liquid contact component is disposed in each stage of absorption, and a gas-liquid contact component is preferably packing.
12. The method according to embodiment wherein the temperature of the circulating liquid is reduced by means of a heat exchanger, and the temperature of the process gas is reduced by spraying the circulating liquid.
13. The method according to embodiment wherein the absorption liquid used in multiple stages along the flow direction of the process gas is replenished in a sequence from the latter stage to the previous stage, and water is replenished in the last stage.
14. A device for implementing the method of any one of embodiments 1 to 13 comprising: a first-stage absorption, a second-stage absorption, a third-stage absorption, a fourth-stage absorption, and an optional higher-stage absorption;

an ammonia addition means, configured to supply an ammonia absorbent to one or more stages of absorption; and a temperature control means, configured to control the temperature of the process gas in the second and third-stage absorptions not to be lower than the temperature of the process gas in the first-stage absorption and control the temperature of the process gas in the fourth and optional higher-stage absorptions to be lower than the temperature of the process gas in the first-stage absorption.

15. The device according to embodiment wherein the ammonia addition means is configured to supply the ammonia absorbent to multi-stage absorption, wherein the amount of ammonia added into a circulating liquid in the last stage of decarbonization absorption is less than that in the previous stage or no ammonia is added.
16. The device according to embodiment wherein the ammonia addition means is configured to supply the ammonia absorbent to multi-stage absorption, wherein the amount of ammonia added into a circulating liquid in the first stage of decarbonization absorption is less than that in the latter stage or no ammonia is added.
17. The device according to embodiment wherein the temperature control means is configured to control the process gas in the second and third-stage absorptions to have the same temperature.
18. The device according to embodiment wherein the temperature control means is configured to control the temperature of the process gas in the second-stage absorption to be lower than the temperature of the process gas in the third-stage absorption.
19. The device according to embodiment wherein the temperature control means is configured to control the temperature of the process gas in the first-stage absorption to be 10° C. to 30° C., control the temperature of the process gas in the second and third-stage absorptions to be 15° C. to 35° C.; and control the temperature of the process gas in the fourth and optional higher-stage absorptions to be 5° C. to 25° C., provided that the temperature of the process gas in the second and third-stage absorptions is not lower than the temperature of the process gas in the first-stage absorption and the temperature of the process gas in the fourth and optional higher-stage absorptions is lower than the temperature of the process gas in the first-stage absorption.
20. The device according to embodiment 14 further comprising an ammonium bicarbonate post-treatment unit, configured to receive an ammonium bicarbonate solution or slurry from the first-stage absorption and produce solid ammonium bicarbonate therefrom.
21. The device according to embodiment wherein the multi-stage absorption is combined in one or more towers, and a device/component that allows gas to pass through is disposed between stages.
22. The device according to embodiment wherein at least one layer of circulating liquid distributor is disposed in each stage of absorption.
23. The device according to embodiment wherein at least one layer of gas-liquid contact component is disposed in each stage of absorption.
24. The device according to embodiment wherein the absorption liquid used in multiple stages along the flow direction of the process gas is replenished in a sequence from the latter stage to the previous stage, and water is replenished in the last stage.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus and methods for decarbonization have been provided. Persons skilled in the art will appreciate that the present invention may be practiced by other than the described embodiments, which are presented for purposes of illustration rather than of limitation. The present invention is limited only by the claims that follow.

What is claimed is:

1. A device for decarbonization, the device comprising:

a first-stage absorption vessel corresponding to a first-stage absorption;

a second-stage absorption vessel corresponding to a second-stage absorption;

a third-stage absorption vessel corresponding to a third-stage absorption;

a fourth-stage absorption vessel corresponding to a fourth-stage absorption; and a higher-stage absorption vessel corresponding to a higher-stage absorption;

an ammonia addition source that is configured to supply an ammonia absorbent to one or more of the vessels; and a temperature controller that is configured to control process gas temperatures:

in the second-and third-stage vessels to be not lower than a temperature of the process gas in the first-stage absorption vessel; and in the fourth-and higher-stage absorption vessels to be lower than a temperature of the process gas in the first-stage absorption.

2. The device of claim 1 wherein the ammonia addition source is configured to supply the ammonia absorbent to two or more of the vessels such that an amount of ammonia added to circulating liquid in the highest stage vessel is less than that added in the immediately preceding stage vessel.

3. The device of claim 1 wherein the ammonia addition source is configured to supply the ammonia absorbent to two or more of the vessels such that an amount of ammonia added to circulating liquid in the first-stage vessel is less than that added in the second-stage vessel.

4. The device of claim 1 wherein the temperature controller is configured to control temperatures of the process gas in the second-and third-stage absorption vessels to be the same.

5. The device of claim 1 wherein the temperature controller is configured to control a temperature of the process gas in the second-stage absorption vessel to be lower than a temperature of the process gas in the third-stage absorption vessel.

6. The device of claim 1 wherein the temperature controller is configured to control:

a temperature of the process gas in the first-stage absorption vessel to be in the range 10° C. to 30° C.;

a temperature of the process gas in each of the second-and third-stage absorption vessels to be in the range 15° C. to 35° C.; and a temperature of the process gas in each of the fourth-and higher-stage absorption vessels to be in the range 5° C. to 25° C.

7. The device according to claim 1 further comprising an ammonium bicarbonate post-treatment unit that is configured to:

receive an ammonium bicarbonate solution or slurry from the first-stage absorption vessel; and produce solid ammonium bicarbonate therefrom.

8. The device according to claim 1 wherein:

one or more of the vessels may be disposed together with one or more of the other vessels in one or more towers;

a device/component that allows gas to pass through is disposed between the vessels;

at least one layer of circulating-liquid distributor is disposed in each vessel; and at least one layer of gas-liquid contact component is disposed in each vessel.

9. The device according to claim 1 wherein:

the vessels are arranged in first sequence, along the flow direction of the process gas, starting with the first-stage absorption vessel and continuing to higher stage vessels;

the apparatus is configured to replenish absorption liquid used in the stages in a second sequence that is opposite the first sequence; and water is replenished only in the highest of the stages.

10. A method for decarbonization, the method comprising:

absorbing, using ammonia, $CO_2$ from a process gas in an absorber including four or more stages of absorption, the four or more stages including:

a first-stage absorption;

a second-stage absorption;

a third-stage absorption;

a fourth-stage absorption; and a higher stage absorption are sequentially arranged along the flow direction of the process gas; and controlling:

a temperature of the process gas in the second and third-stage absorptions to be not lower than a temperature of the process gas in the first-stage absorption; and a temperature of the process gas in the fourth and higher-stage absorptions to be lower than the temperature of the process gas in the first-stage absorption.

11. The method of claim 10 further comprising, in the absorber, adding ammonia to a circulating liquid in the stages;

wherein an amount of ammonia added in the last stage is less than that added in a stage immediately prior to the last stage.

12. The method of claim 10 further comprising, in the absorber, adding ammonia to a circulating liquid in the stages;

wherein an amount of ammonia added in the first stage is less than that added in a stage immediately following the first stage.

13. The method of claim 10 further comprising controlling a temperature of the process gas in the second stage and a temperature of the process gas in the third stage to be the same.

14. The method of claim 10 further comprising controlling a temperature of the process gas in the third stage to be higher than a temperature of the process gas in the second stage.

15. The method of claim 10 further comprising controlling:

a temperature of the process gas in the first-stage to be in the range 10° C. to 30° C.;

temperatures of the process gas in each of the second-and third-stages to be in the range 15°° C. to 35° C.;

temperatures of the process gas in each of the fourth-and higher-stages to be in the range 5° C. to 25° C.;

wherein:

temperatures of the process gas in each of the second-and third-stage absorptions are not lower than the temperature of the process gas in the first-stage absorption; and temperatures of the process gas in each of the fourth-and higher-stage absorptions are lower than the temperature of the process gas in the first-stage absorption.

16. The method of claim 10 further comprising promoting generation of ammonium bicarbonate in the first-stage absorption by controlling:

a temperature of the process gas in the first-stage of absorption; and an amount of ammonia addition to the stages.

17. The method of claim 10 further comprising:

collecting in the first-stage absorption an ammonium bicarbonate solution or slurry; and producing from the solution or slurry solid ammonium bicarbonate.

18. The method of claim 10 further comprising:

reducing a temperature of a circulating liquid fed to the stages by use of a heat exchanger; and reducing a temperature of the process gas by spraying the circulating liquid at the process gas.

19. The method of claim 10 further comprising, when absorption liquid is used in multiple stages along a flow direction of the process gas, and water is used in a last of the stages:

replenishing the absorption liquid in a sequence from one of the stages to an immediately previous stage; and replenishing the water.

* * * * *